(12) United States Patent
Midda

(10) Patent No.: US 8,171,228 B2
(45) Date of Patent: May 1, 2012

(54) GARBAGE COLLECTION IN A CACHE WITH REDUCED COMPLEXITY

(75) Inventor: Srinivasulu Dharmika Midda, Nandyal (IN)

(73) Assignee: Oracle International Corporation, Redwood Shores, CA (US)

(*) Notice: Subject to any disclaimer, the term of this patent is extended or adjusted under 35 U.S.C. 154(b) by 422 days.

(21) Appl. No.: 12/616,793

(22) Filed: Nov. 12, 2009

(65) Prior Publication Data

US 2011/0113201 A1   May 12, 2011

(51) Int. Cl.
*G06F 12/12* (2006.01)

(52) U.S. Cl. .................................. 711/136; 711/133

(58) Field of Classification Search .................. None
See application file for complete search history.

(56) References Cited

U.S. PATENT DOCUMENTS

| | | | |
|---|---|---|---|
| 6,463,508 B1 | 10/2002 | Wolf et al. | |
| 6,601,143 B1 | 7/2003 | Lamparter | |
| 6,807,607 B1 | 10/2004 | Lamparter | |
| 7,076,611 B2 | 7/2006 | Steere et al. | |
| 7,231,496 B2 | 6/2007 | Curtis | |
| 7,275,135 B2 | 9/2007 | Coulson | |
| 2003/0110357 A1 | 6/2003 | Nguyen et al. | |
| 2004/0148463 A1 | 7/2004 | Brown et al. | |
| 2008/0120469 A1* | 5/2008 | Kornegay et al. | 711/133 |
| 2011/0307664 A1* | 12/2011 | Paver et al. | 711/128 |

OTHER PUBLICATIONS

"Kaveh Samiee", "A Replacement Algorithm Based on Weighting and Ranking Cache Objects", International Journal of Hybrid Information Technology, vol. 2, No. 2, Publication Date: Apr. 2009, pp. 93-104.

"Nicoleta Liviana Tudor", "An Improved LRU Algorithm for Replacement of Objects from Cache", Studies in Informatics and Control, http://www.ici.ro/ici/revista/sic2006_4/art05.html, Publication Date: Sep. 2006, vol. 15, No. 4, pp. 1-2.

"Ekow Otoo, Frank Olken and Arie Shoshani", "Disk Cache Replacement Algorithm for Storage Resource Managers in Data Grids", Proceedings of the 2002 ACM/IEEE conference on Supercomputing, Publication Date: 2002, pp. 1-15.

"Himabindu Pucha and Saumitra M. Das", "Dyncode : An Architecture for Transparent Dynamic Content Delivery", The Twelfth International World Wide Web Conference, http://www2003.org/cdrom/papers/poster/p239/dynamic.htm, Publication Date: May 20-24, 2003, pp. 1-3.

* cited by examiner

*Primary Examiner* — Than Nguyen
(74) *Attorney, Agent, or Firm* — Narendra Reddy Thappeta

(57) ABSTRACT

Garbage collection associated with a cache with reduced complexity. In an embodiment, a relative rank is computed for each cache item based on relative frequency of access and relative non-idle time of cache entry compared to other entries. Each item having a relative rank less than a threshold is considered a suitable candidate for replacement. Thus, when a new item is to be stored in a cache, an entry corresponding to an identified item is used for storing the new item.

20 Claims, 5 Drawing Sheets

| | 301 | 302 | 303 | 304 |
|---|---|---|---|---|
| | Cache entry | Last Accessed Date | Hit count | Expiration Date |
| 322 → | 1 | 12-Aug | 200 | 12-Nov |
| 323 → | 2 | 5-Aug | 500 | 15-Oct |
| 324 → | 3 | 20-Aug | 50 | 15-Sep |
| 325 → | 4 | 25-Aug | 400 | 30-Oct |
| 326 → | 5 | 29-Jul | 20 | 30-Sep |

*FIG. 3A*

| | 301 | 302 | 303 | 304 |
|---|---|---|---|---|
| | Cache entry | Last Accessed Date | Hit count | Expiration Date |
| 322 → | 1 | 12-Aug | 200 | 12-Nov |
| 323 → | 2 | 2-Sep | 501 | 15-Oct |
| 324 → | 3 | 20-Aug | 50 | 15-Sep |
| 325 → | 4 | 25-Aug | 400 | 30-Oct |
| 326 → | 5 | 29-Jul | 20 | 30-Sep |

| | Cache entry (301) | Last Accessed Date (302) | Idle Duration (403) | Hit count (303) | Expiration Date (304) | Life Duration (406) | Rank (407) | Non-idle score (408) | Frequency score (409) | Life score (410) |
|---|---|---|---|---|---|---|---|---|---|---|
| 422 → | 1 | 12-Aug | 23 | 200 | 12-Nov | 68 | 1.005 | 0.82 | 0.85 | 1.68 |
| 423 → | 2 | 2-Sep | 4 | 501 | 15-Oct | 41 | 3.219 | 4.75 | 2.13 | 1.01 |
| 424 → | 3 | 20-Aug | 17 | 50 | 15-Sep | 11 | 0.677 | 1.11 | 0.21 | 0.27 |
| 425 → | 4 | 25-Aug | 12 | 400 | 30-Oct | 56 | 1.581 | 1.58 | 1.70 | 1.38 |
| 426 → | 5 | 29-Jul | 39 | 20 | 30-Sep | 26 | 0.397 | 0.48 | 0.08 | 0.64 |

FIG. 4B

| | Average Idle Duration (411) | Average Hit count (412) | Average Life Duration (413) | Threshold (414) |
|---|---|---|---|---|
| 427 → | 19 | 234 | 40.4 | 1 |

FIG. 5

| | Cache entry (501) | Last Accessed Date (502) | Hit count (503) | Expiration Date (504) |
|---|---|---|---|---|
| 572 → | 1 | 12-Aug | 200 | 12-Nov |
| 573 → | 2 | 2-Sep | 501 | 15-Oct |
| 574 → | 4 | 25-Aug | 400 | 30-Oct |

GARBAGE COLLECTION IN A CACHE WITH REDUCED COMPLEXITY

BACKGROUND

1. Technical Field

The present disclosure relates to caches used in memory systems and more specifically to garbage collection in caches.

2. Related Art

A cache stores a copy of source data maintained in a source memory, and is located closer to a component (e.g., processor) seeking to access the data for reasons such as higher throughput performance. The component is provided the ability to access a data item of interest from the cache if such data item is present in the cache, and the data is retrieved from the source memory if not present in the cache, as is well known in the relevant arts. Caches find use in diverse areas to speed up accesses to data such as that may be stored as a source data in a random access memory (RAM), that may be stored in a database (secondary storage based), etc. Thus, a cache contains multiple entries in a memory, with each entry storing a copy ("cache item") of a data item that is also stored in a corresponding source memory.

Garbage collection refers to identifying suitable entry or entries for storing new data items in a cache. The need for such identification typically stems from the limited number of entries in a cache. In one approach, garbage collection is performed periodically to identify a set of entries that contain data items unlikely to be accessed again, and these set of entries are thereafter used to store new data items. In addition or in the alternative, when a new entry is available for storing and there are no unused entries (i.e., no entries with not-valid data item stored) garbage collection is initiated to identify one or more suitable entries for storing data items (including the available data item).

Garbage collection requires various resources such as computational power and memory, the magnitude of which may be characterized as (computational/memory requirements) complexity of the corresponding approach. Several prior approaches perform garbage collection based on parameters such as idle time of an entry (i.e., duration the entry has not been accessed in cache), the hit frequency (i.e., the number of times the entry was accessed in a pre-specified duration). Some of these approaches require sorting of the parameter values and/or complex data structures to determine the suitable entries for replacement. Such approaches would accordingly be characterized by correspondingly higher computational and/or memory complexity.

It is often desirable that garbage collection be performed with reduced complexity in terms of memory and/or computational requirements.

BRIEF DESCRIPTION OF THE DRAWINGS

Example embodiments of the present invention are described with reference to the accompanying drawings briefly described below.

FIG. 3A depicts a table illustrating the activity information maintained for each cache item in an embodiment of the present invention.

FIG. 3B is a table illustrating the manner in which the activity information for cache items is updated in an embodiment of the present invention.

FIG. 4A is a table depicting the computations performed for garbage collection in an embodiment of the present invention.

FIG. 4B is a table depicting some of the aggregate information maintained for garbage collection, in an embodiment of the present invention.

FIG. 5 depicts a table illustrating the removal of the cache items upon being identified as being suitable for replacement/removal, in an embodiment of the present invention.

In the drawings, like reference numbers generally indicate identical, functionally similar, and/or structurally similar elements. The drawing in which an element first appears is indicated by the leftmost digit(s) in the corresponding reference number.

DESCRIPTION OF EXAMPLE EMBODIMENTS

1. Overview

An aspect of the present invention provides an improved garbage collection approach for use with a cache. In an embodiment, a relative rank is computed for each cache item based on relative frequency of access and relative non-idle time of cache entry compared to other entries. Each item having a relative rank less than a threshold is considered a suitable candidate for replacement. Thus, when a new item is to be stored in a cache, an entry corresponding to an identified item is used for storing the new item.

According to another aspect of the present invention, remaining life duration of each entry is also considered in determining the suitability of an item for replacement. The remaining life duration is computed based on the expiration date of an object.

According to another aspect of the present invention, respective scores based on relative hit counts (e.g., based on an average hit count), relative idle durations, and relative life duration, are computed, and the relative rank for each item is computed as a weighted average of the scores. As a result, suitable items for replacement may be identified, without overheads such as sorting of the entries, and is thus suitable in case of caches having a large number of entries.

Several aspects of the present invention are described below with reference to examples for illustration. However, one skilled in the relevant art will recognize that the invention can be practiced without one or more of the specific details or with other methods, components, materials and so forth. In other instances, well-known structures, materials, or operations are not shown in detail to avoid obscuring the features of the invention. Furthermore, the features/aspects described can be practiced in various combinations, though only some of the combinations are described herein for conciseness.

2. Example Environment

Figure 1:
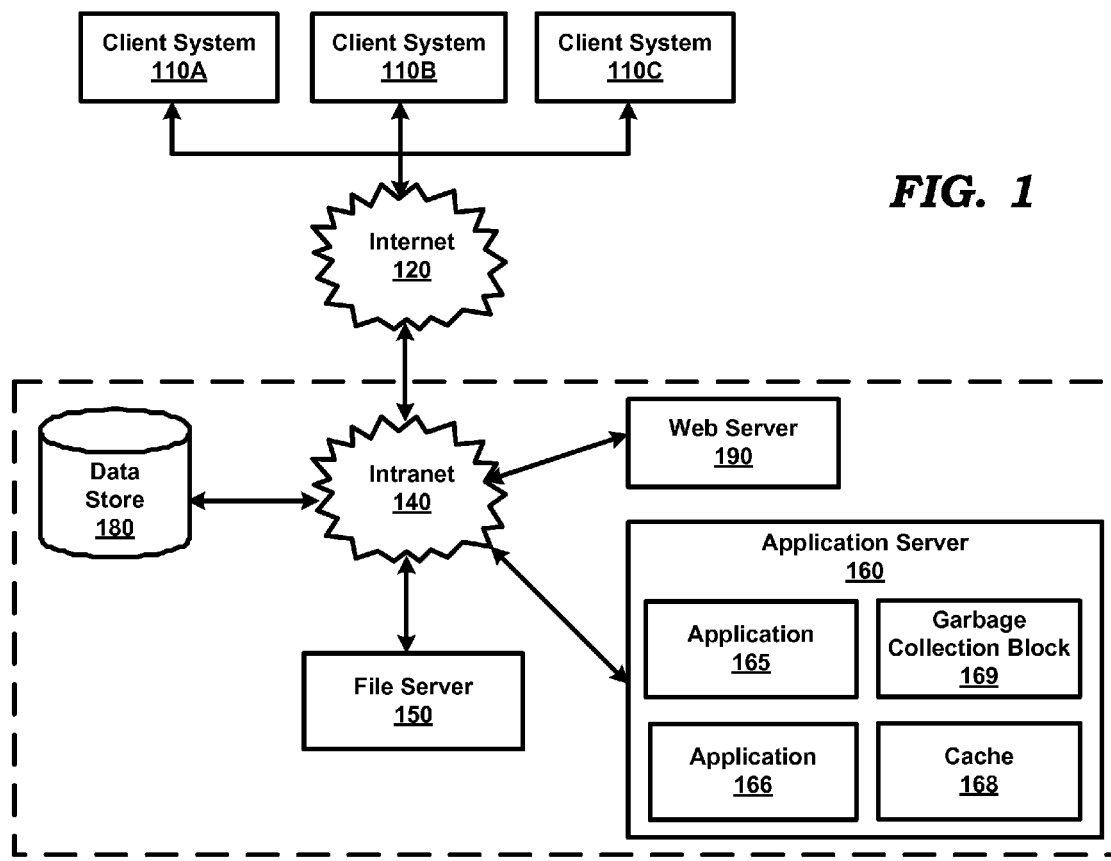
FIG. 1 is a block diagram illustrating the details of an example computing system in which several aspects of the present invention can be

FIG. 1 is a block diagram illustrating the details of an example environment (computing system) in which several aspects of the present invention can be implemented. The block diagram is shown containing client systems 110A-110C, internet 120, intranet 140, web server 190, application server 160, file server 150 and data store 180. Application server 160 is in turn shown containing applications 165 and 166, garbage collection block 169 and cache 168. Each of the blocks is described below in further detail.

Merely for illustration, only representative number/type of systems is shown in the Figure. Many environments often contain many more systems, both in number and type, depending on the purpose for which the environment is designed. Each block of FIG. 1 is described below in further detail.

Intranet 140 represents a network providing connectivity between web server 190, data store 180, application server 160, and the file server 150 all within an enterprise. Internet 120 extends the connectivity of these (and other systems of the enterprise) with external systems such as client systems 110A-110C.

Each of intranet 140 and Internet 120 may be implemented using protocols such as Internet Protocol (IP) well known in the relevant arts. In general, in IP environments, an IP packet is used as a basic unit of transport, with the source address being set (in the originating system) to the IP address assigned to the source system from which the packet originates and the destination address set to the IP address of the target system to which the packet is to be eventually delivered. The packet is said to originate at the source system and be directed to the target system.

Each of client systems 110A-110C represents a system such as a personal computer, workstation, mobile station, etc., to access various applications provided within application server 160, or to access other information on the worldwide web. The applications may be accessed based on HTTP requests generated by applications, such as a web browser, executing in the client system (in response to a user interaction). In response to sending the requests, the client system receives a web page (or other suitable response), as implemented in the corresponding environment.

Data store 180 represents a non-volatile storage facilitating storage and retrieval of a collection of data by application server 160. In one embodiment, data store 180 is implemented using relational database technologies and therefore provides storage and retrieval of data using structured queries such as SQL (Structured Query Language). File server 150 stores computer files such as static web pages (or portions thereof), documents, photos, movies etc., in a non-volatile memory.

Web server 190 controls access to applications executing on application server 160 in addition to providing access to other data/services to client systems 110A-110C. Web server 190 examines the access requests received from client system, and determines the manner in which to process each request based on the URL forming the request. In case the request is to access static web pages, the corresponding web page may be retrieved from file server 150 and served to the requesting client. In case the request is to access dynamic web pages, the request may be forwarded to the appropriate one of applications 165/166, which provide the dynamic data. The received data may again be rendered as a response to the received request.

Applications 165/166 create dynamic content for serving as web pages. The data may be returned to web server 190 for serving as web page responses. Each application may form objects, which are sent as dynamic content. At least some of the objects may be stored as data items in respective entries of cache 168. It should be appreciated that each object represents precisely the same data that is retrieved from data store 180, or further computationally manipulated to form each object.

Cache 168 may have a limited number of entries, for example, since all items are stored only in a random access memory. As may be readily appreciated, when an application seeks to retrieve an item present in a cache (cache hit), the corresponding data is quickly retrieved. On the other hand, if the data item (object) is not present in cache 168 (cache miss), data from data store 180 may need to be retrieved. The determination of whether a desired object is present or not in cache 168, may be performed using approaches well known in the relevant arts. It is sufficient to assume that each application is designed to examine the cache for the presence of a desired object, to access/form the item in case of a cache miss, and store the formed data item (if the cache management policy, so requires) in an available entry.

Garbage collection block 169 determines one or more entries of cache, suitable for storing (or replacement) by newly created objects, according to several aspects of the present invention, as described below with examples.

3. Garbage Collection with Reduced Complexity

Figure 2:
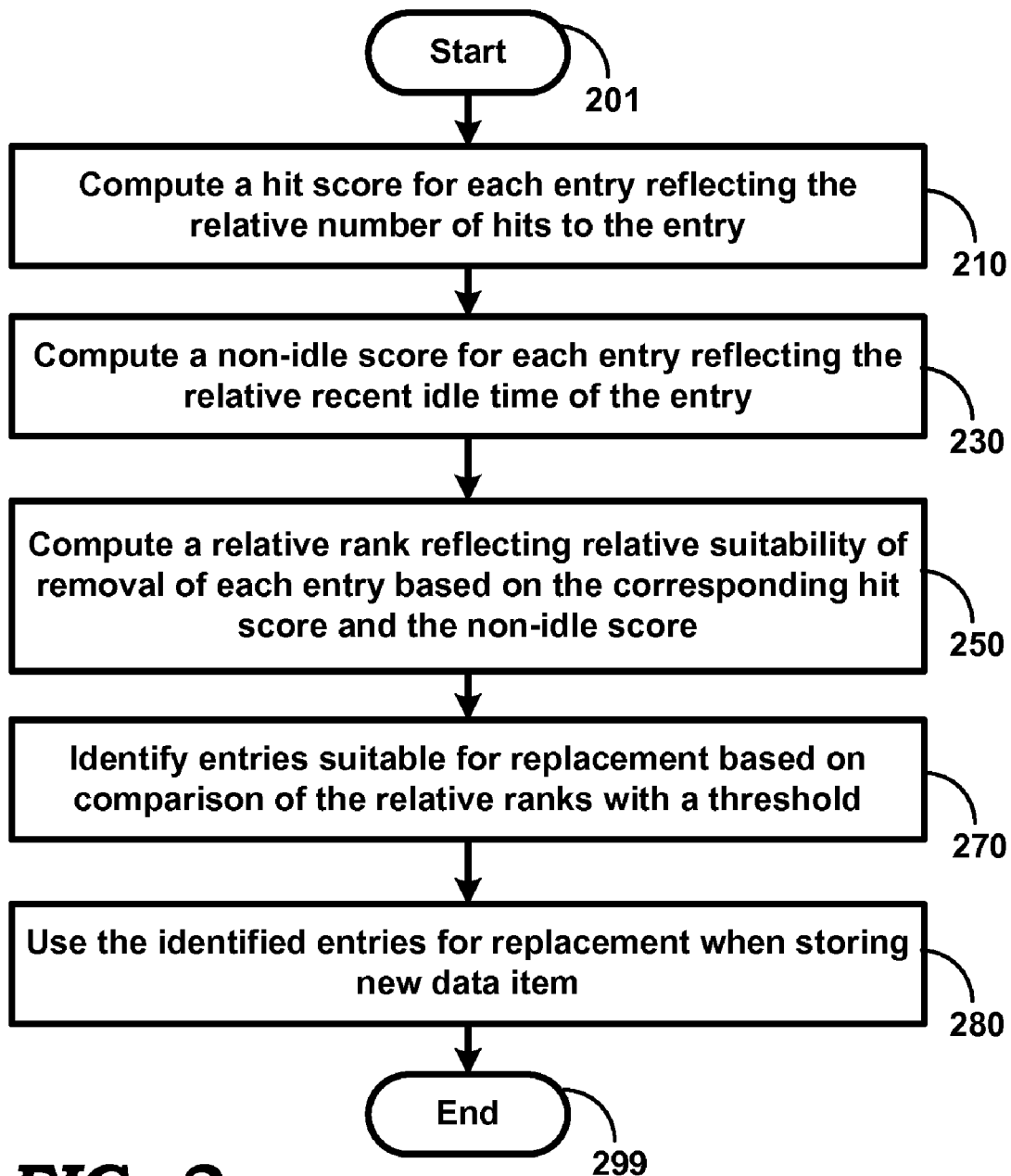
FIG. 2 is flow chart illustrating the manner in which complexity of garbage collection of a cache is reduced according to several aspects of the present invention.

FIG. 2 is a flowchart illustrating the manner in which complexity of garbage collection is reduced according to several aspects of the present invention. The flowchart is described with respect to FIG. 1 merely for illustration. However, various features can be implemented in other environments also without departing from the scope and spirit of various aspects of the present invention, as will be apparent to one skilled in the relevant arts by reading the disclosure provided herein.

In addition, some of the steps may be performed in a different sequence than that depicted below, as suited in the specific environment, as will be apparent to one skilled in the relevant arts. Many of such implementations are contemplated to be covered by several aspects of the present invention. The flow chart begins in step 201, in which control immediately passes to step 210.

In step 210, garbage collection block 169 computes a hit score for each entry reflecting the relative number of hits to the entry. The hit score needs to reflect the number of hits to the corresponding entry. The term relative implies that the value computed for the hit score has to also reflect whether there is less or more hits (e.g., higher score for more hits) compared to those for other entries based on the corresponding hit scores. In an embodiment described below, the hit score for all entries is with respect to a common duration and thus the hit score represents a frequency score in that duration.

In step 230, garbage collection block 169 computes a non-idle score for each entry reflecting the relative recent idle time of the entry. The non-idle score needs to reflect how recently the corresponding entry has been used. The term relative implies that the value computed for the non-idle score has to also reflect whether an entry has been accessed more recently or less recently based on the score for another entry.

In step 250, garbage collection block 169 computes a relative rank for each cache entry based on the rank score and non-idle score. The rank reflects suitability of removal of the entry based on the corresponding hit score and the non-idle score. The term 'relative' rank implies that inspection of two ranks should indicate which of the two entries is more or less suitable for replacement. In general, the suitability is higher for lower hit frequency and more recent idle time.

In step 270, garbage collection block 169 identifies entries suitable for replacement based on comparison of the relative ranks with a threshold. For example, in an embodiment described below, all entries having a relative rank less than a threshold are deemed to be suitable for replacement.

The threshold may be varied to meet objectives such as, selecting the better entries only for replacement, to converge on identification quickly with an acceptable level of accuracy, etc. In particular, it may be appreciated that choosing a higher value of threshold may cause the earlier compared entries to be quickly selected as being suitable for replacement, while a low value may cause insufficient number of entries to be identified as being suitable.

Accordingly, in one implementation, a designer first sets a target maximum as an objective and once that many entries are identified as being suitable for replacement, step 270 is ended, without having to examine the score of the remaining entries. In addition, the threshold may be started with a lower value and increased gradually over multiple iterations until the target maximum number of entries is identified for replacement.

In step 280, garbage collection block 169 uses the set (one or more) of entries that have been identified in step 270 for replacement with new data items. For example, when application 165 forms a new object, the object is stored as an item in one of the identified set of entries. The flow chart then ends in step 299.

It may thus be appreciated that the approach of above determines the entries suitable for replacement without requiring sort type techniques, thereby reducing the computational complexity at least at the time of performing garbage collection. Such an approach is particularly useful as the number of entries becomes large (e.g., at least thousands of objects being stored in cache 168).

The approaches described above may be implemented with various modifications, without departing from the scope and spirit of several aspects of the present invention, as will be apparent to one skilled in the relevant arts by reading the disclosure provided herein. The description is continued with respect to some example implementations.

4. Example Implementation

FIG. 3A illustrates the information ("activity information") maintained by garbage collection block 169 for each cache item in an embodiment of the present invention. The table there is shown containing four columns 301-304 and five rows 322-326. Each row corresponds to an item in cache 168. Column 301 stores a cache entry identifier, column 302 stores the last accessed date, column 303 stores hit count of the entry, column 304 shows the expiration date of the entry.

Merely for ease of understanding, it is assumed that last accessed information is maintained as day/date, though in typical implementations, the access time may be logged at much finer (e.g., as seconds or sub-seconds) granularity. Furthermore, the hit count may be reset for all entries, for example, after each garbage collection operation or periodically otherwise. The status of table of FIG. 3A is assumed to be on August 31.

FIG. 3B shows the activity information shown in FIG. 3A updated after cache entry id=2 was accessed on September 2. The hit count in column 303 is increased to 501 and the last access date of the cache entry is shown updated to September 2 in column 302. The information for the remaining cache entries are shown unchanged.

FIGS. 4A and 4B illustrate the computation of relative ranks in an embodiment. It is assumed that there have been no accesses until September 5th, and the ranks are computed on that date. The approach here further takes into account the expiration date in column 304 (the time up to which the corresponding item is valid) of each stored item. Such information is often available when retrieved from data store 180.

FIG. 4A is table illustrating the computations performed based on the activity information. Idle duration in column 403 indicates the duration of the corresponding entry that has not been accessed and is computed as the present/current time minus last accessed date for the entry/item. Life duration in column 406 is computed as expiration date minus the current time. The averages of columns 403, 303 and 406 are computed and the results are shown respectively as 411, 412 and 413 in FIG. 4B. Column 414 further contains a threshold used in selecting suitable entries for replacement.

According to an aspect of the present invention, the relative rank for each item is computed as a weighted average of the scores for relative hit counts, relative idle durations, and relative life duration. The weights (multiplication factors) used for each of the scores may be fixed (for the cache) or configured by a user (for example, based on the application type).

The description is continued assuming that the rank calculation is based on the weights W1=0.5, W2=0.2, W3=0.3 and the formulas for calculating the rank as well as the frequency score, the non-idle score and expiration score is shown below:

Rank (407)=$W1$*non-idle score (408)+$W2$*frequency score (409)+$W3$*life score (410)

Non-idle score (408)=Average idle duration (411)/Idle duration (403)

Frequency score (409)=Hit count (303)/Average hit count (412)

Life score (410)=Life duration (406)/Average life duration (413)

FIG. 5 depicts the activity information after removal of the items identified by garbage collection based on a threshold shown in FIG. 4B. Garbage collection block 160 inspects the rank of each cache entry and identifies entries having a relative rank less than a pre-specified threshold as being suitable for replacement. Also the corresponding cache entries in cache 168 are shown removed during garbage collection. Thus, the cache entries corresponding to rows 424 and 426 are shown removed. It may be appreciated that alternative techniques may mere mark each identified entry as being unavailable until replaced by a new item.

It should be appreciated that the approach above is more likely to retain an item (or less like to remove an item) for higher number of hits, for lower idle time, and for higher life duration. Furthermore, the formulas shown above are also merely illustrative and various alternatives, without departing from the scope and spirit of the present invention, will be apparent to one skilled in the relevant arts by reading the disclosure provided herein.

It should be appreciated that the features described above (in particular garbage collection block 169) can be implemented in various embodiments as a desired combination of one or more of hardware, executable modules, and firmware. The description is continued with respect to an embodiment in which various features are operative when the executable modules are executed.

5. Digital Processing System

Figure 6:
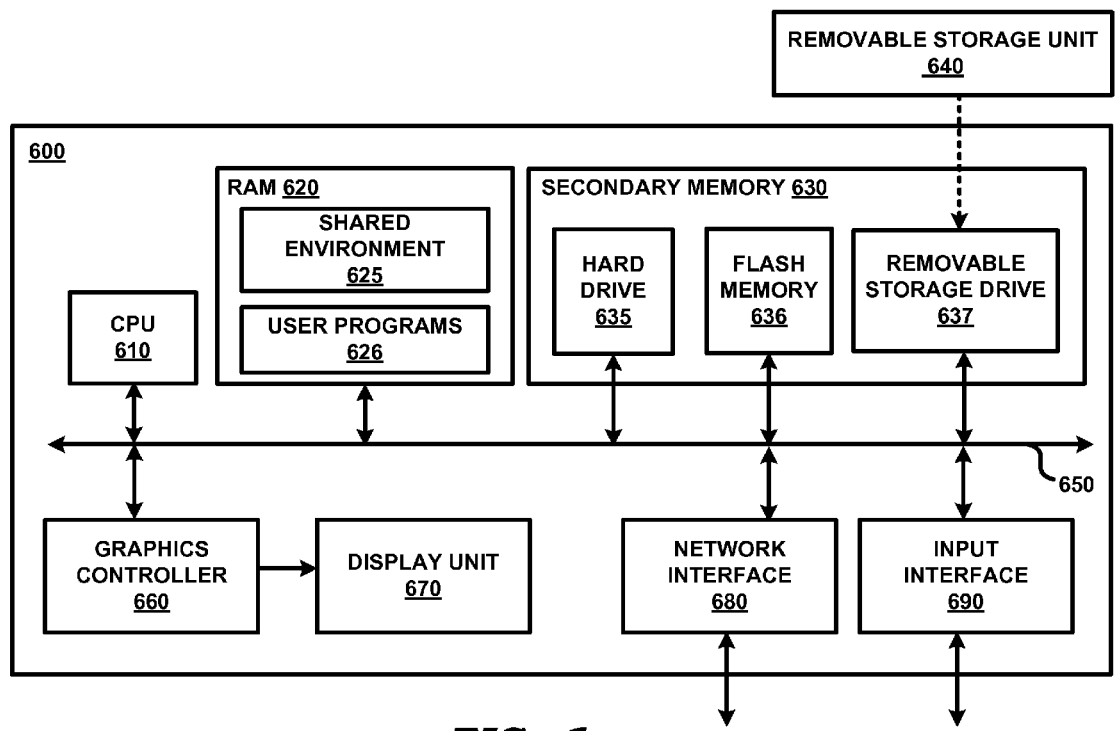
FIG. 6 is a block diagram illustrating the details of a digital processing system in which several aspects of the present invention are operative by execution of appropriate instructions contained in executable modules.

FIG. 6 is a block diagram illustrating the details of digital processing system 600 in which several aspects of the present invention are operative by execution of appropriate instructions contained in executable modules. Digital processing system 600 corresponds to application server 160.

Digital processing system 600 may contain one or more processors (such as a central processing unit (CPU) 610), random access memory (RAM) 620, secondary memory 630, graphics controller 660, display unit 670, network interface 680, and input interface 690. Network interface 680 facilitates communication with external systems such as file server 150 and data store 180. All the components except display unit 670 may communicate with each other over communication path 650, which may contain several buses as is well known in the relevant arts. The components of FIG. 6 are described below in further detail.

CPU 610 may execute instructions stored in RAM 620 to provide several features of the present invention (including those described above with respect to garbage collection block 169). CPU 610 may contain multiple processing units, with each processing unit potentially being designed for a specific task. Alternatively, CPU 610 may contain only a single general-purpose processing unit.

RAM 620 may receive instructions from secondary memory 630 using communication path 650, and provides the instructions to CPU 610 for execution. RAM 620 is shown containing software instructions constituting shared environment 625 and user programs 626. The user programs (including applications 165 and 166) related to individual users and represent applications such as word processing, billing software, customer relationship management, etc. On the other hand, the shared environment contains the programs forming the general run-time environment, including operating system, Virtual Machine software, device drivers, etc. Garbage collection block 169 may be implemented within the shared environment. RAM 620 may also store data such as the items of cache 168 and activity information described above.

Graphics controller 660 generates display signals (e.g., in RGB format) to display unit 670 based on data/instructions received from CPU 610. Display unit 670 contains a display screen to display the images defined by the display signals. Input interface 690 may correspond to a keyboard and a pointing device (e.g., touch-pad, mouse). Network interface 680 provides connectivity to a network (e.g., using Internet Protocol), and may be used to communicate with other connected systems (such as client system 110A-110C, file server 150, data store 180 and web server 190).

Secondary memory 630 (non-volatile memory) may contain hard drive 635, flash memory 636, and removable storage drive 637. Secondary memory 630 may store the data and software instructions, which enable digital processing system 600 to provide several features in accordance with the present invention.

Some or all of the data and instructions may be provided on removable storage unit 640, and the data and instructions may be read and provided by removable storage drive 637 to CPU 610. Floppy drive, magnetic tape drive, CD-ROM drive, DVD Drive, Flash memory, removable memory chip (PCMCIA Card, EPROM) are examples of such removable storage drive 637.

Removable storage unit 640 may be implemented using medium and storage format compatible with removable storage drive 637 such that removable storage drive 637 can read the data and instructions. Thus, removable storage unit 640 includes a computer readable storage medium having stored therein computer software and/or data. However, the computer (or machine, in general) readable storage medium can be in other forms (e.g., non-removable, random access, etc.).

In this document, the term "computer program product" is used to generally refer to removable storage unit 640 or hard disk installed in hard drive 635. These computer program products are means for providing software to digital processing system 600. CPU 610 may retrieve the software instructions, and execute the instructions to provide various features of the present invention described above.

It should be understood that numerous specific details, relationships, and methods are set forth to provide a full understanding of the invention. For example, many of the function units described in this specification have been labeled as modules/blocks in order to more particularly emphasize their implementation independence.

Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

Furthermore, the described features, structures, or characteristics of the invention may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the invention.

6. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

It should be understood that the figures and/or screen shots illustrated in the attachments highlighting the functionality and advantages of the present invention are presented for example purposes only. The present invention is sufficiently flexible and configurable, such that it may be utilized in ways other than that shown in the accompanying figures.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method of operating a cache, said cache containing a plurality of entries, each to store a corresponding one of a plurality of items, said method comprising:

computing a hit score and a non-idle score for each of said plurality of items, said hit score reflecting a relative number of hits to the item compared to all of said plurality of items, said non-idle score reflecting a relative recent idle time of the item compared to all of said plurality of items;

calculating a relative rank for each of said plurality of items, said relative rank reflecting relative suitability of removal of the item based on the corresponding hit score and the non-idle score;

identifying a set of items as being suitable for replacement, each item being identified as being suitable based on a comparison of the relative rank with a threshold, said set of items being a subset of said plurality of items; and using the entries corresponding to said set of items for replacement when storing new data items in said cache.

2. The method of claim 1, wherein said calculating computes said relative rank based also on an expiration time of the data item in the corresponding cache entry.

3. The method of claim 2, wherein said hit score for an item is relatively higher for each of more number of hits to the corresponding item, lesser time elapsed since the last time the entry was accessed in the cache, and for more duration to the expiration time from a current time instance.

4. The method of claim 2, wherein said computing comprises:

maintaining a hit count and an idle count for each of said plurality of items, said hit count representing a number of hits to the corresponding entry in a pre-specified common duration, and said idle count representing a duration elapsed since the corresponding entry is last accessed; and generating an average hit measure and an average non-idle measure for all of said plurality of items together based on said hit count and said idle count respectively, wherein said relative suitability is higher for higher values of said hit count and for lower values of said idle count for the corresponding entry.

5. The method of claim 4, wherein said computing further comprises generating an average life duration of the items in said cache, wherein said calculating computes said relative rank for each entry as a weighted average of the hit count/the average hit measure, the average idle measure/the idle count, and the life duration/the average life duration for each entry, wherein the life duration is computed as the expiration time of the item minus the current time.

6. The method of claim 1, wherein said cache is implemented in a memory of an application server, wherein each of said data items is an object formed based on retrieval from a database operating as a source memory.

7. The method of claim 1, wherein said set of items are identified without having to sort said plurality of items.

8. A machine readable medium storing one or more sequences of instructions for operating a cache in a server, said cache containing a plurality of entries, each entry to store a corresponding one of a plurality of items, wherein execution of said one or more sequences of instructions by one or more processors contained in said server causes said server to perform the actions of:

computing a hit score and a non-idle score for each of said plurality of items, said hit score reflecting a relative number of hits to the item compared to all of said plurality of items, said non-idle score reflecting a relative recent idle time of the item compared to all of said plurality of items;

calculating a relative rank for each of said plurality of items, said relative rank reflecting relative suitability of removal of the item based on the corresponding hit score and the non-idle score;

identifying a set of items as being suitable for replacement, each item being identified as being suitable based on a comparison of the relative rank with a threshold, said set of items being a subset of said plurality of items; and using the entries corresponding to said set of items for replacement when storing new data items in said cache.

9. The computer readable medium of claim 8, wherein said calculating computes said relative rank based also on an expiration time of the data item in the corresponding cache entry.

10. The computer readable medium of claim 9, wherein said hit score for an item is relatively higher for each of more number of hits to the corresponding item, lesser time elapsed since the last time the entry was accessed in the cache, and for more duration to the expiration time from a current time instance.

11. The computer readable medium of claim 9, wherein said computing comprises:

maintaining a hit count and an idle count for each of said plurality of items, said hit count representing a number of hits to the corresponding entry in a pre-specified common duration, and said idle count representing a duration elapsed since the corresponding entry is last accessed; and generating an average hit measure and an average non-idle measure for all of said plurality of items together based on said hit count and said idle count respectively, wherein said relative suitability is higher for higher values of said hit count and for lower values of said idle count for the corresponding entry.

12. The computer readable medium of claim 11, wherein said computing further comprises generating an average life duration of the items in said cache, wherein said calculating computes said relative rank for each entry as a weighted average of the hit count/the average hit measure, the average idle measure/the idle count, and the life duration/the average life duration for each entry, wherein the life duration is computed as the expiration time of the item minus the current time.

13. The computer readable medium of claim 8, wherein said cache is implemented in a memory of an application server, wherein each of said items is an object formed based on retrieval from a database operating as a source memory.

14. The computer readable medium of claim 8, wherein said set of items are identified without having to sort said plurality of data items.

15. A computing system comprising:

a data source storing items;

a cache containing a plurality of entries, each to store an item, a plurality of items being stored in corresponding entries of said cache; and a garbage collection block operable to:

compute a hit score and a non-idle score for each of said plurality of items, said hit score reflecting a relative number of hits to the item compared to all of said plurality of items, said non-idle score reflecting a relative recent idle time of the item compared to all of said plurality of items;

calculate a relative rank for each of said plurality of items, said relative rank reflecting relative suitability of removal of the item based on the corresponding hit score and the non-idle score;

identify a set of items as being suitable for replacement, each item being identified as being suitable based on a comparison of the relative rank with a threshold, said set of items being a subset of said plurality of items; and use the entries corresponding to said set of items for replacement when storing new data items in said cache.

16. The computing system of claim 15, wherein said garbage collection block is further operable to compute said relative rank based also on an expiration time of the data item in the corresponding cache entry.

17. The computing system of claim 16, wherein said hit score for an item is relatively higher for each of more number of hits to the corresponding item, lesser time elapsed since the last time the entry was accessed in said cache, and for more duration to the expiration time from a current time instance.

18. The computing system of claim 16, to perform said compute, said garbage collection block is operable to:

maintain a hit count and an idle count for each of said plurality of items, said hit count representing a number of hits to the corresponding entry in a pre-specified common duration, and said idle count representing a duration elapsed since the corresponding entry is last accessed; and generate an average hit measure and an average non-idle measure for all of said plurality of items together based on said hit count and said idle count respectively, wherein said relative suitability is higher for higher values of hit count and for lower values of idle count for the corresponding entry.

19. The computing system of claim 18, to perform said compute, said garbage collection block is further operable to generate an average life duration of the items in said cache, wherein said calculate computes said relative rank for each entry as a weighted average of the hit count/the average hit measure, the average idle measure/the idle count, and the life duration/the average life duration for each entry, wherein the life duration is computed as the expiration time of the item minus the current time.

20. The computing system of claim 15, wherein said cache is implemented in a memory of an application server, wherein each of said data items is an object formed based on retrieval from a database operating as a data source.

* * * * *

UNITED STATES PATENT AND TRADEMARK OFFICE
CERTIFICATE OF CORRECTION

PATENT NO. : 8,171,228 B2  Page 1 of 1
APPLICATION NO. : 12/616793
DATED : May 1, 2012
INVENTOR(S) : Midda It is certified that error appears in the above-identified patent and that said Letters Patent is hereby corrected as shown below:

In column 1, line 61, delete "be" and insert -- be implemented. --, therefor.

Signed and Sealed this
Thirty-first Day of July, 2012

David J. Kappos
*Director of the United States Patent and Trademark Office*